UNITED STATES PATENT OFFICE.

SÖREN LEMVIG FOG AND AAGE GEORG KIRSCHNER, OF COPENHAGEN, DENMARK.

PROCESS OF MAKING MATCHES.

SPECIFICATION forming part of Letters Patent No. 676,882, dated June 25, 1901.

Application filed December 5, 1898. Serial No. 698,247. (No specimens.)

*To all whom it may concern:*

Be it known that we, SÖREN LEMVIG FOG and AAGE GEORG KIRSCHNER, subjects of the King of Denmark, residing at Copenhagen, in the Kingdom of Denmark, have invented certain new and useful Improvements in Processes of Making Matches, (for which we have applied for patents in Norway, dated November 5, 1898; in France, dated November 4, 1898; in Belgium, dated November 3, 1898; in Italy, dated November 4, 1898; in Sweden, dated November 2, 1898; in Denmark, dated October 31, 1898; in England, dated November 1, 1898, and in Russia, dated October 29, 1898,) of which the following is a specification.

The methods hitherto employed for the production of matches free from phosphorus consist in the use of cold solutions containing a mixture of chlorate of potassium, sulfur, antimony sulfate, powdered glass or quartz, salts of ammonia, peroxid of manganese, and the like, together with some cementitious material, into which solutions the matches are dipped, and the mixture adheres to the external surface of the match. All matches made with such compositions, whatever their nature, have had to be saturated with paraffin or similar hydrocarbon, as without such means they would ignite at the moment of being struck, but would not continue to burn.

Now this invention has for its object a process in which chlorates are employed in a more convenient manner and preferably without any admixture for the manufacture of matches. Various chlorates may be used—for instance, chlorate of sodium or of potassium, &c.—but barium chlorate has proved most suitable.

According to the present process matches are made as follows: The ends of the ready-cut wood or sticks of cellulose or the like are put into the same horizontal plane by means of a shaking apparatus in the usual manner and made into bundles containing any desired number, so that the several sticks touch, (in contradistinction to the method ordinarily employed in match-factories, in which the several matches are set at a little distance apart,) and are then immersed in a preferably boiling-hot and preferably concentrated solution of the chlorate or chlorates used. At ordinary pressures this solution has a temperature of about 100° to 111° centigrade, according to the degree to which it is concentrated. The process may also be carried out under pressure or *in vacuo* in closed receivers, in which case the temperatures will vary accordingly.

Matches made with chlorate of calcium tend to absorb water, and therefore deteriorate. If a solution of chlorate of sodium alone be used, the matches ignite upon being rubbed upon a suitably-prepared surface with such an explosive force that the impregnated part of the match may fly off and the remaining part of the match not be ignited at all. Chlorate of sodium, moreover, is hygroscopic, although not so strongly so as chlorate of calcium. Chlorate of potassium is not sufficiently soluble in water. If, therefore, chlorate of potassium were used alone in the present process, sufficient salt would not readily be taken up by the wood. Chlorate of potassium being cheaper than chlorate of barium would be preferable were it not for these drawbacks; but it may be used in conjunction with the chlorate of barium.

Chlorate of barium is sufficiently soluble in water, so that sufficient salt is absorbed by the wood. Moreover, it is not hygroscopic, but has the great advantage that it loses part of its water of crystallization when stored, so that matches made with chlorate of barium improve by being kept. Furthermore, chlorate of barium possesses the advantage over chlorate of sodium that the matches made with it do not ignite explosively and the wood has time to become ignited.

These matches are intended for use with prepared striking-surfaces, such as are used with Swedish matches.

If the sticks were dry at the time of being immersed, it might happen that the solution of chlorate or chlorates would be absorbed too far up the sticks; but to prevent this and to exactly determine the height to which impregnation takes place the sticks are preferably saturated with water before immersion. By the length of time during which the immersion is continued and the depth of immersion of the sticks the extent of impregnation can then be exactly predetermined. After drying and the crystallization that takes place during the same, and after removal of the superfluous salt adhering to the surface, the sticks are perfectly ready for use and present an almost smooth surface.

Matches produced in this manner may be impregnated at one end only or at both ends. In the former case it is well to mark the impregnated end by coloring it.

We claim—

1. The process of preparing matches consisting in impregnating a permeable matchstick with water and subsequently immersing the portion of the stick in a heated aqueous solution containing essentially barium chlorate and thereafter drying it.

2. The improvement in the art of manufacturing headless matches impregnated in part with ignitible salts, which consists in first saturating the match-splints with water and thereafter immersing their ends to a limited extent in the impregnating solution, whereby the extent of impregnation may be definitely controlled, substantially as set forth.

In testimony whereof we have hereunto set our hands in the presence of two witnesses.

SÖREN LEMVIG FOG.
AAGE GEORG KIRSCHNER.

Witnesses:
C. BLEEHINGBERG,
R. VOLKHOLZ.